(12) United States Patent  
Bruntmyer (10) Patent No.: US 7,178,813 B1
(45) Date of Patent: Feb. 20, 2007

(54) SCOOTER (75) Inventor: Joseph A. Bruntmyer, Hickory, NC (US)

(73) Assignee: Jostro Products, Inc., Hickory, NC (US)

(*) Notice: Subject to any disclaimer, the term of this patent is extended or adjusted under 35 U.S.C. 154(b) by 352 days.

(21) Appl. No.: 10/773,675

(22) Filed: Feb. 6, 2004

(51) Int. Cl.
B60G 1/00 (2006.01)

(52) U.S. Cl. .............................. 280/87.041; 280/87.042

(58) Field of Classification Search ........... 280/87.042, 280/87.043, 7.13, 7.12, 87.041, 11.23, 267, 280/268, 14.28, 11.28
See application file for complete search history.

(56) References Cited

U.S. PATENT DOCUMENTS

| | | | | |
|---|---|---|---|---|
| 94,056 | A * | 8/1869 | Allen | ........................ 280/267 |
| 1,070,468 | A | 8/1913 | Henley | |
| 1,138,263 | A | 5/1915 | Tutt | |
| 1,150,773 | A | 8/1915 | La Chall | |
| 1,239,196 | A | 9/1917 | Lundquist | |
| 1,445,219 | A | 2/1923 | Larson | |
| 1,572,789 | A * | 2/1926 | Griffin | ..................... 280/14.28 |
| 1,617,337 | A | 2/1927 | Lees | |
| 1,637,614 | A * | 8/1927 | Kohler | .................. 280/87.043 |
| 1,698,165 | A * | 1/1929 | Martin | .................. 280/87.043 |
| 1,732,374 | A | 10/1929 | Neal | |
| 1,747,227 | A * | 2/1930 | Daniel | .................. 280/87.043 |
| 1,755,299 | A * | 4/1930 | Linden | .................. 280/87.043 |
| 2,062,800 | A | 12/1936 | Shreffler | |
| 2,170,616 | A | 8/1939 | Gorton | |
| 2,330,147 | A | 9/1943 | Rodriguez | |
| 2,366,866 | A | 1/1945 | Moller | |
| 2,651,526 | A * | 9/1953 | Eubanks | ....................... 280/99 |
| 2,861,814 | A * | 11/1958 | Rebhun | ....................... 280/243 |
| D199,682 | S | 12/1964 | Jezowski | |
| D200,864 | S | 4/1965 | De Roco | |
| 3,197,227 | A | 7/1965 | Anselmo | |
| 3,203,706 | A * | 8/1965 | Boyden | ..................... 280/7.12 |
| D218,628 | S | 9/1970 | Gonzalez | |
| 3,620,547 | A | 11/1971 | Vaverek | |
| 3,751,062 | A | 8/1973 | White | |
| 3,827,706 | A | 8/1974 | Millman | |
| 3,986,725 | A * | 10/1976 | Terry | .......................... 280/240 |
| D242,735 | S | 12/1976 | Candler | |
| 4,088,334 | A * | 5/1978 | Johnson | .................. 280/11.206 |
| 4,093,252 | A | 6/1978 | Rue | |
| 4,168,076 | A * | 9/1979 | Johnson | .................. 280/11.216 |
| 4,182,520 | A | 1/1980 | Stevenson | |
| 4,323,261 | A | 4/1982 | Samuelson | |
| 4,337,963 | A | 7/1982 | Stevenson | |
| 4,385,761 | A | 5/1983 | Rice | |
| 4,555,122 | A * | 11/1985 | Harvey | .................. 280/87.041 |
| 4,732,400 | A | 3/1988 | Santini | |
| 4,861,055 | A * | 8/1989 | Jones | ........................ 280/234 |

(Continued)

Primary Examiner—Christopher P. Ellis
Assistant Examiner—Bridget Avery (57) ABSTRACT A scooter is described herein having control cables for use in guiding the scooter. In the preferred embodiment a cable is used to straighten the rear wheels which are connected in tandem and a steering column with a t-top is used to steer the front wheels. In an alternate embodiment of the invention a pair of cables are joined to the steering columns and are used on both the front and rear wheels for steering purposes. Both embodiments of the invention utilize a brake assembly connected to a rearward platform extension. When the platform extension is depressed, brake pads engage the wheels to slow the motion of the scooter.

10 Claims, 8 Drawing Sheets

U.S. PATENT DOCUMENTS

| | | | |
|---|---|---|---|
| 5,954,349 A * | 9/1999 | Rutzel | 280/87.041 |
| 6,120,044 A * | 9/2000 | Tsai | 280/87.05 |
| 6,206,390 B1 * | 3/2001 | Borg | 280/87.042 |
| 6,386,562 B1 * | 5/2002 | Kuo | 280/87.042 |
| 7,066,480 B2 * | 6/2006 | Brichet et al. | 280/234 |

* cited by examiner

SCOOTER

FIELD OF THE INVENTION

The invention herein pertains to scooters and particularly pertains to scooters which utilize control cables to assist in steering and guiding purposes.

DESCRIPTION OF THE PRIOR ART AND OBJECTIVES OF THE INVENTION

Manually powered scooters have become increasingly popular in recent years, particularly ones with a single front and rear wheel. The front wheel is generally steerable with a rotatable upright main column directly connected to the front wheel and may employ a simple friction rear wheel brake. Such scooters are generally manufactured from metals such as aluminum and many employ wooden parts for the riding platform. The relatively primitive steering and braking mechanisms of standard scooters do not provide for the precision control required in the current scooter environment in which scooters travel at much greater speeds. Older, slower scooters were generally used for short time periods on sidewalks and paths and therefore less mobility was required than with modern scooters of today that are used in racing, trick and jumping competitions.

Thus with the problems and disadvantages associated with the older scooter steering and braking controls, the present invention was conceived and one of its objectives is to provide a scooter having improved steering and braking.

It is another objective of the present invention to provide a scooter in which rear wheel brakes can be applied in a more gradual, controlled fashion.

It is still another objective of the present invention to provide a scooter having a pair of front and rear wheels in which the wheel pairs are controlled in tandem.

It is yet another objective of the present invention to provide a scooter in which the rear wheels can be easily, selectively straightened as needed while riding by use of a hand control.

It is still another objective of the present invention to provide a scooter in an alternate embodiment in which the front and rear wheel pairs are independently controlled by two c-shaped handles on the steering column.

It is yet a further objective of the present invention to provide a scooter having a steering column which is foldable against the platform for compact storage and transportation purposes.

Various other objectives and advantages of the present invention will become apparent to those skilled in the art as a more detailed description is set forth below.

SUMMARY OF THE INVENTION

The aforesaid and other objectives are realized by providing a four wheel scooter in the preferred form having a control cable extending from a handle on the steering column to the rear wheels. By squeezing the handle the rider straightens or brings the rear wheels into longitudinal alignment with the platform. The front wheels are steered by turning a t-top on the steering column. A platform extension at the rear of the platform is hingedly connected thereto to allow the rider to depress the extension by foot to apply brakes gradually to the rear wheels as needed.

In an alternate embodiment of the scooter, control cables are affixed to both the front and rear wheels for steering purposes. The steering column is not turned to guide the scooter, rather opposing, independent c-shaped handles atop the steering column are rotated in a forward or rearward direction to operate cables which turn the wheels respectively to the right or left. When on the scooter the rider's left c-shaped handle controls the rear wheels and the right c-shaped handle controls the front wheels. A brake assembly similar to that utilized in the preferred embodiment is also employed.

DETAILED DESCRIPTION OF THE PREFERRED EMBODIMENT AND OPERATION OF THE INVENTION

Figure 1:
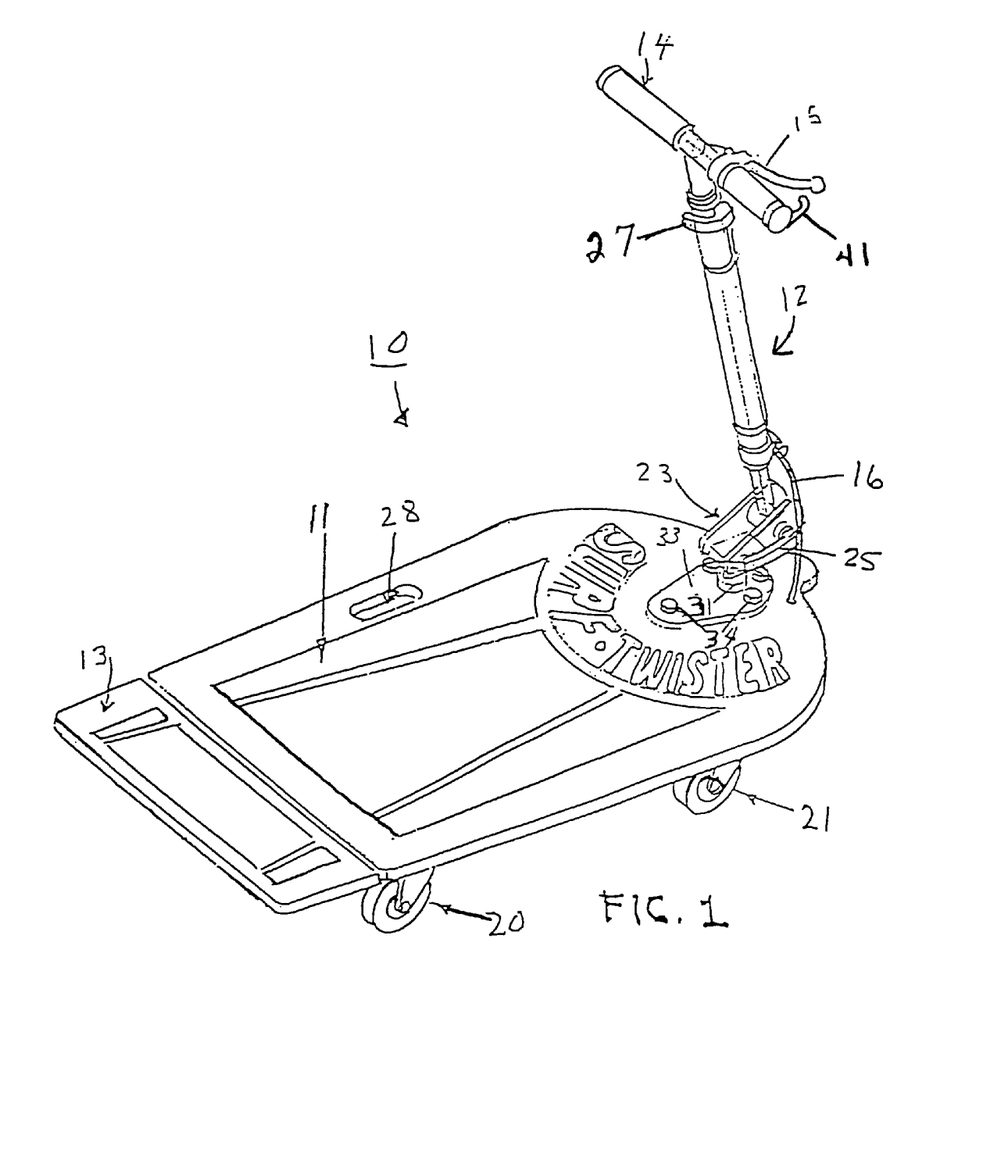
FIG. 1 shows a top perspective view of the preferred embodiment of the invention.

For a better understanding of the invention and its operation, turning now to the drawings, FIG. 1 demonstrates a perspective view of preferred scooter 10 having a planar platform 11 formed from wood or other suitable materials, with foldable steering column 12 attached thereto. Platform extension 13 is joined to the rear of platform 11 by hinge 22 and provides a convenient surface for braking by foot as will be hereinafter described in more detail below.

Figure 2:
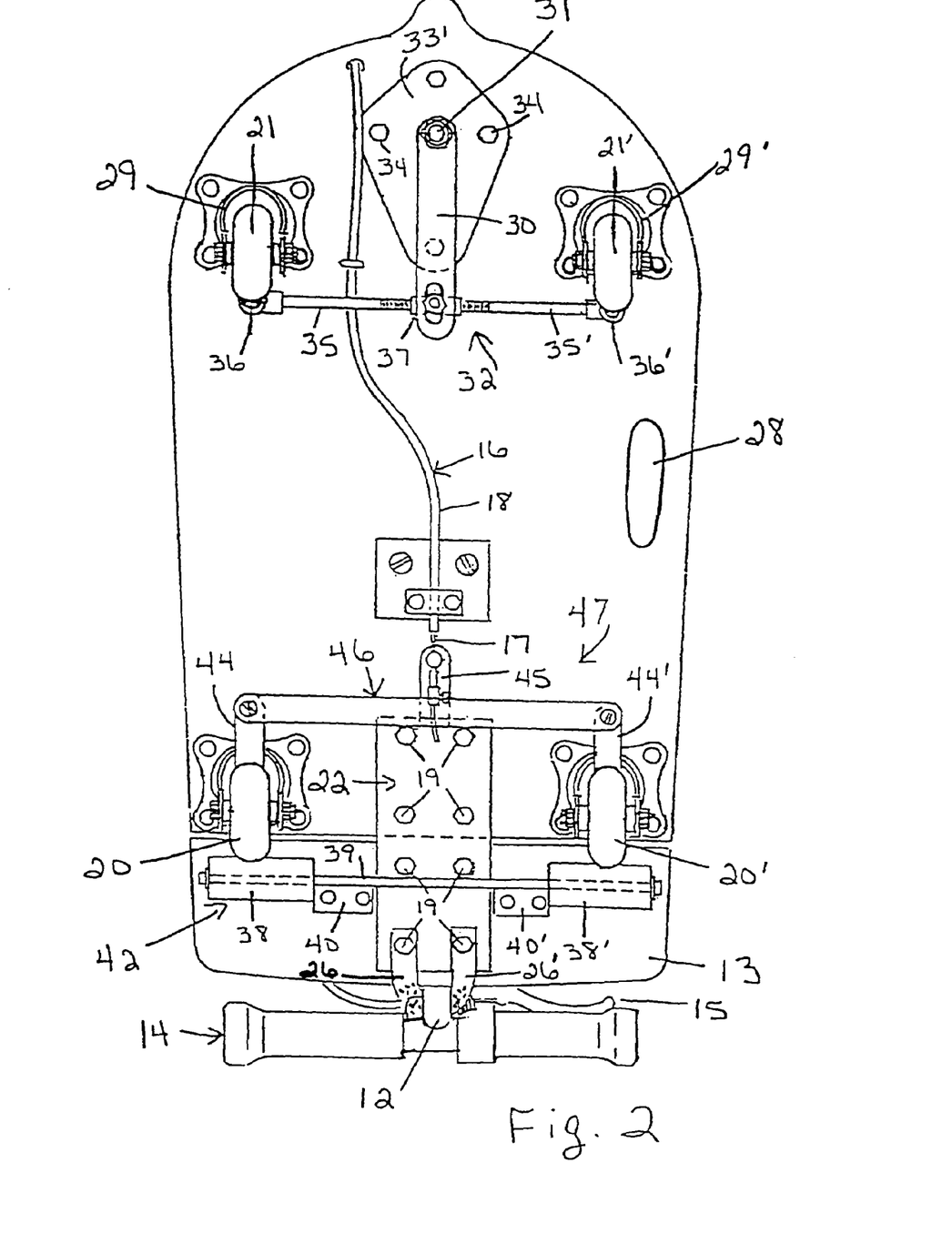
FIG. 2 demonstrates a bottom plan view of the preferred scooter as shown in FIG. 1.

Steering column 12 includes t-top 14 with pivotable handle 15 affixed thereto having movable catch 41. Steering cable 16 is attached to handle 15 and is used to straighten or align rear wheels 20, 20' simultaneously into longitudinal alignment with platform 11 as shown in FIG. 2. During this alignment, the rider can place handle 15 within catch 41 to hold and maintain wheels 20, 20' in a straight or aligned position. Latch 27 on steering column 12 can be loosened and t-top 14 telescopically extended from or withdrawn into steering column 12. Latch 27 can be tightened (closed against steering column 12) once t-top 14 is adjusted to accommodate the rider's height and reach as desired. Column latch 25 on column bracket 23 is shown closed or "latched" in FIG. 1 and can be manually released to allow column 12 to pivot rearwardly against platform 11 for convenient storage, carrying and transportation of scooter 10.

In FIG. 2, t-top 14 is shown with tie-down straps 26, 26' bolted to platform extension 13. Straps 26, 26' are preferably formed of nylon with hook and loop fasteners. Straps 26, 26' are tightened around folded steering column 12 to maintain steering column 12 firmly against the top of platform 11 for compact storage and shipping. Platform 11 defines hand opening 28 for ease in carrying scooter 10.

Platform extension 13 is preferably formed from wood although plastic or other suitable materials may be used as stated for platform 11. Platform extension 13 is secured to platform 11 by rectangular nylon hinge 22 which consists of a thin, resilient planar nylon sheet secured by bolts 19 to platform 11 and extension 13. When extension 13 is depressed, for example, by the rider's foot, brake assembly 42 which includes cylindrically shaped brake pads 38, 38', brake axle 39 and L-shaped brackets 40, 40' allow brake pads 38, 38' to contact rear wheels 20, 20' respectively to retard or stop the movement of scooter 10. Brake pads 38, 38' are rotatably positioned on brake axle 39 which is joined by L-shaped brackets 40, 40' to extension 13. As also seen in FIG. 2, brake pads 38, 38' are wider than rear wheels 20, 20' to apply friction regardless of the wheel angle or direction. Once extension 13 is released after braking, hinge 22 quickly returns extension 13 to its level, coplanar alignment with platform 11.

Figure 4:
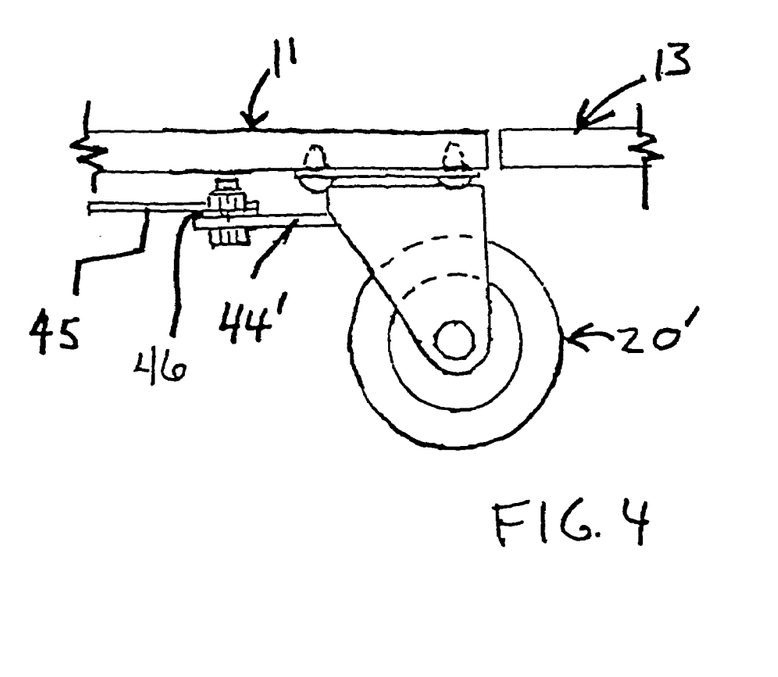
FIG. 4 pictures a side elevational view of a rear wheel thereof.

Front wheels 21, 21' are turned by the rider rotating steering column 12 whereas rear wheels 20, 20' are turned usually by the rider (not shown) shifting his weight as he rides or stands on platform 11. If needed while riding to straighten or bring rear wheels 20, 20' into longitudinal alignment with platform 11 as seen in FIG. 2, steering cable 16 is employed which is attached to rear steering linkage 47 which includes rear steering arm 45, rear steering rod 46, and first and second rear housing arms 44, 44'. By grasping and squeezing pivotable handle 15 on t-top 14, wire 17 (FIG. 2) slidably positioned in cable sheath 18 is effectively shortened, causing rear wheel housing arms 44, 44' (FIG. 4) to align longitudinally and become parallel with steering arm 45. Rear steering rod 46 then becomes perpendicular to first and second rear housing arms 44, 44' as rear wheels 20, 20' align longitudinally with platform 11 (as seen in FIG. 2). Movable catch 41 on t-top 14 allows handle 15 to be secured in place if desired to maintain rear wheels 20, 20' in the aligned position with cable 16 in its shortened posture.

Figure 3:
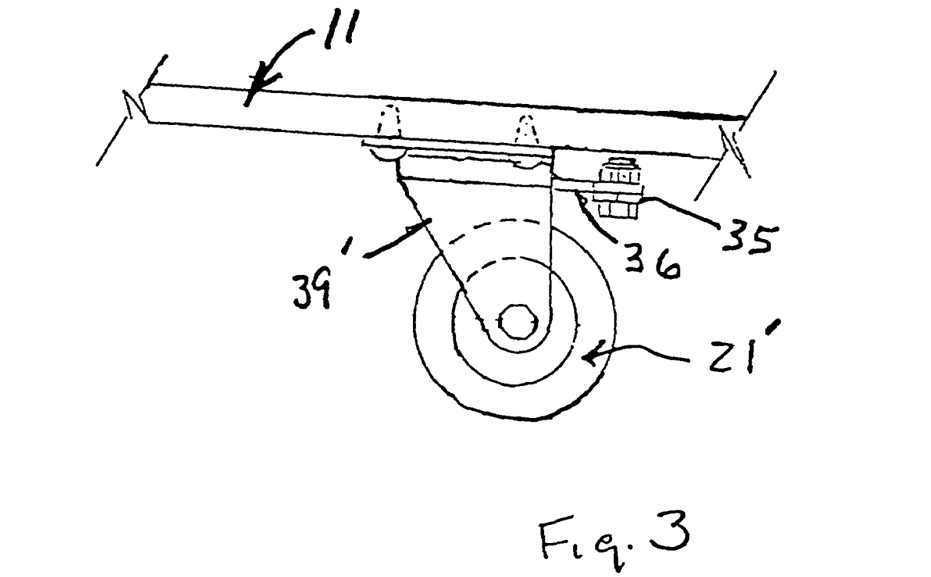
FIG. 3 illustrates a side elevational view of a front wheel of the scooter seen in FIG. 1.

To steer scooter 10, t-top 14 is manually turned by the rider as conventional for steering purposes. Column 12 is joined to front steering linkage 32 consisting of column arm 30 as shown in FIG. 2 and first front steering rod 35, second front steering rod 35', connector 37 and first and second housing arms 36, 36' (see also FIG. 3). Steering column stud 31 is joined to column bracket 23 and passes through upper steering column plate 33 (FIG. 1), platform 11 and lower steering column plate 33'. Column plates 33, 33' are held to platform 11 by four (4) bolts 34. As t-top 14 is rotated left to right as in normal steering, column arm 30 (FIG. 2) joined to steering column stud 31 is likewise turned to manipulate first front steering rod 35 and second front steering rod 35'. First steering rod 35 and second front steering rod 35' are each threadably adjustable within connector 37 which is pivotally attached to column arm 30. First steering rod 35 is likewise pivotally joined to first housing arm 36 (FIG. 3) whereas second steering rod 35' is pivotally joined to second housing arm 36', thereby allowing rotation of t-top 14 to steer front wheels 21, 21' contained within first and second front wheel housings 29, 29' respectively.

Figure 5:
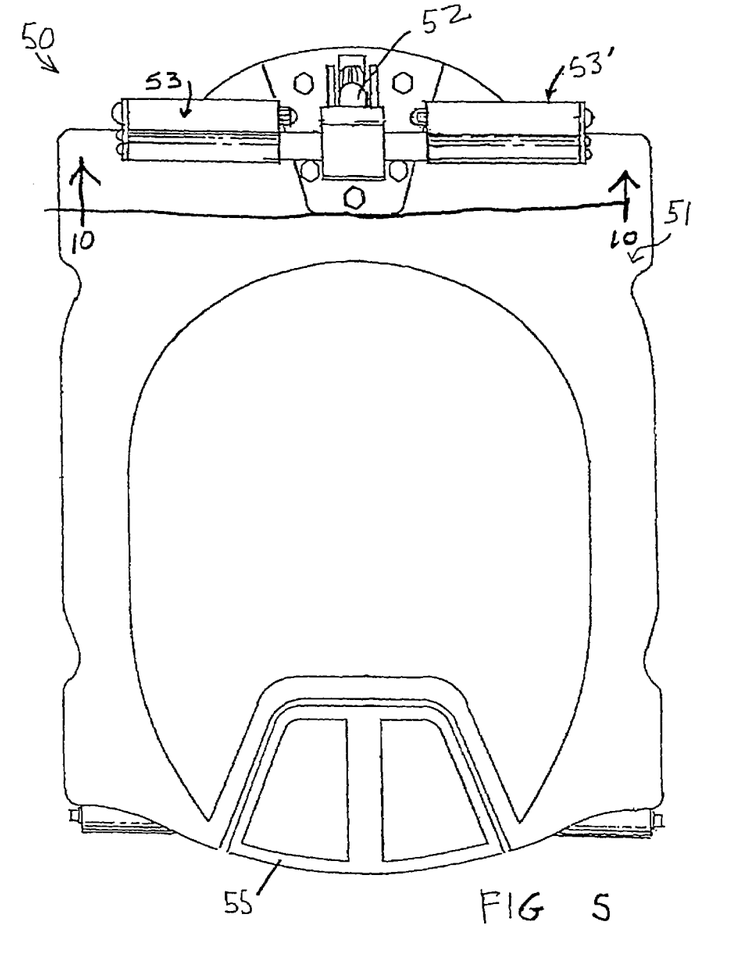
FIG. 5 shows a top plan view of an alternate embodiment of the scooter.
Figure 6:
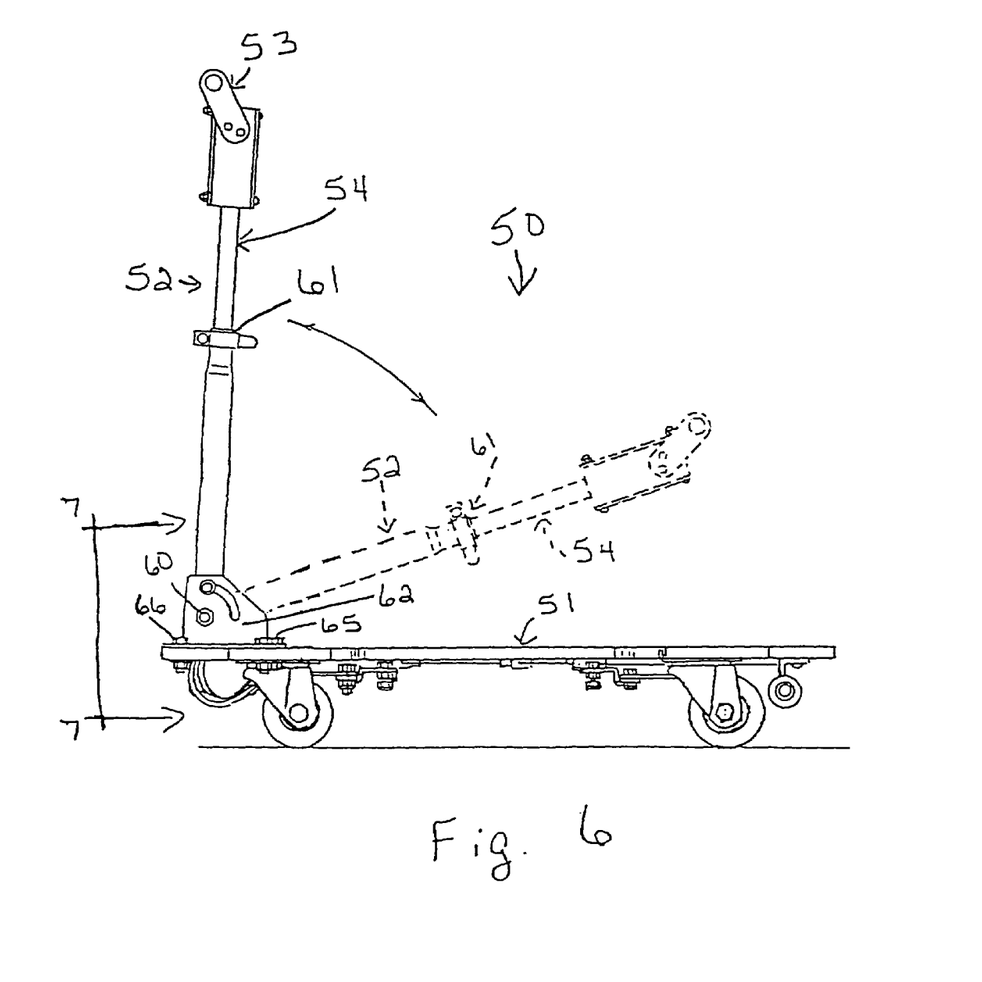
FIG. 6 features a side elevational view of the scooter as seen in FIG. 5.
Figure 7:
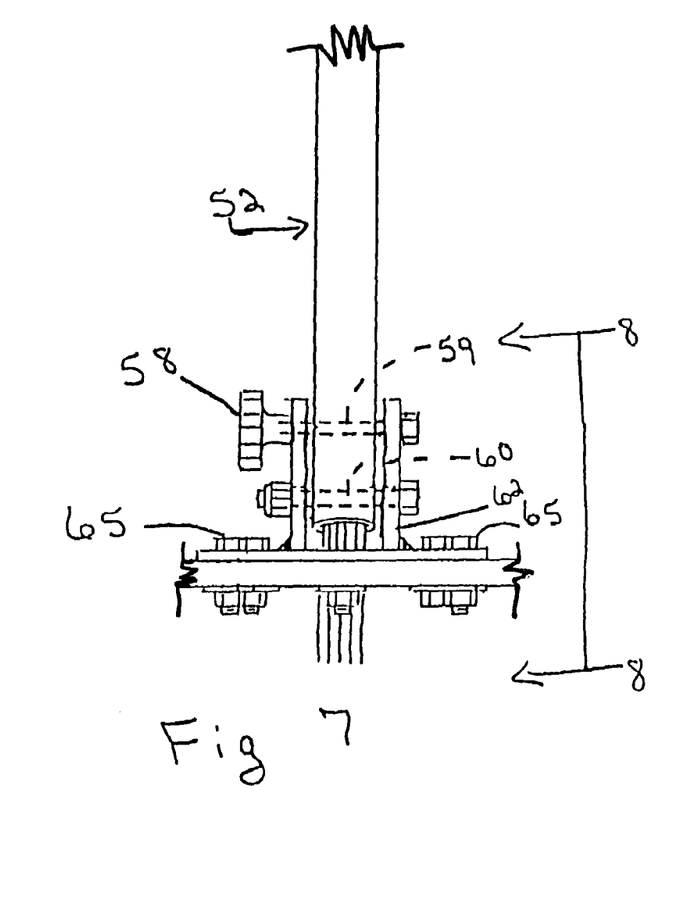
FIG. 7 depicts an enlarged front schematic view of the steering column bracket as seen along lines 7—7 of FIG. 6.
Figure 8:
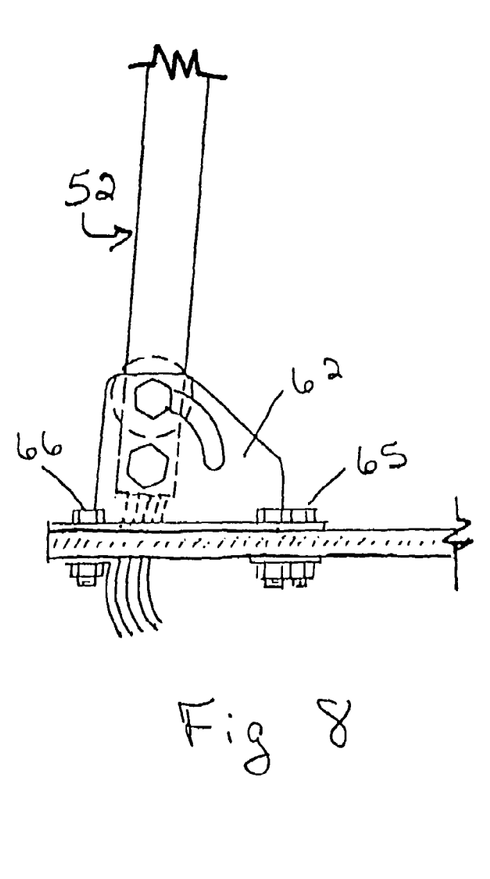
FIG. 8 demonstrates a side elevational view of the steering column bracket as shown in FIG. 7 along lines 8—8.

A top plan view of an alternate embodiment of the invention is shown in FIG. 5 as scooter 50. Scooter 50 includes platform 51, foldable steering column 52 with c-shaped handles 53, 53' pivotally affixed thereto. Four (4) wheels are attached to platform 51, two (2) front wheels, first and second front wheels 77, 77' respectively and two (2) rear wheels, first rear wheel 80 and second rear wheel 80'. Foldable steering column 52 is shown in FIGS. 6, 7 and 8 whereby knob 58 (FIG. 7) can be loosened on threaded member 59 to allow steering column 52 to collapse against and contact the top of platform 51, seen somewhat collapsed in FIG. 6 in dashed lines. Once steering column 52 is fully collapsed and rests against platform 51, knob 58 can be tightened to hold steering column 52 in place, for example during storage or transportation of scooter 50.

As shown in FIG. 6, steering column 52 pivots on threaded member 60 in column bracket 62. Column bracket 62 is mounted to platform 51 by bolts 65, 66 as also seen in FIGS. 7 and 8. Steering column 52 can be adjusted for various heights of riders by loosening clamp 61, extending or retracting upper telescoping section 54 as required and then re-tightening clamp 61 once telescoping section 54 has been suitably positioned (see FIG. 6).

Figure 9:
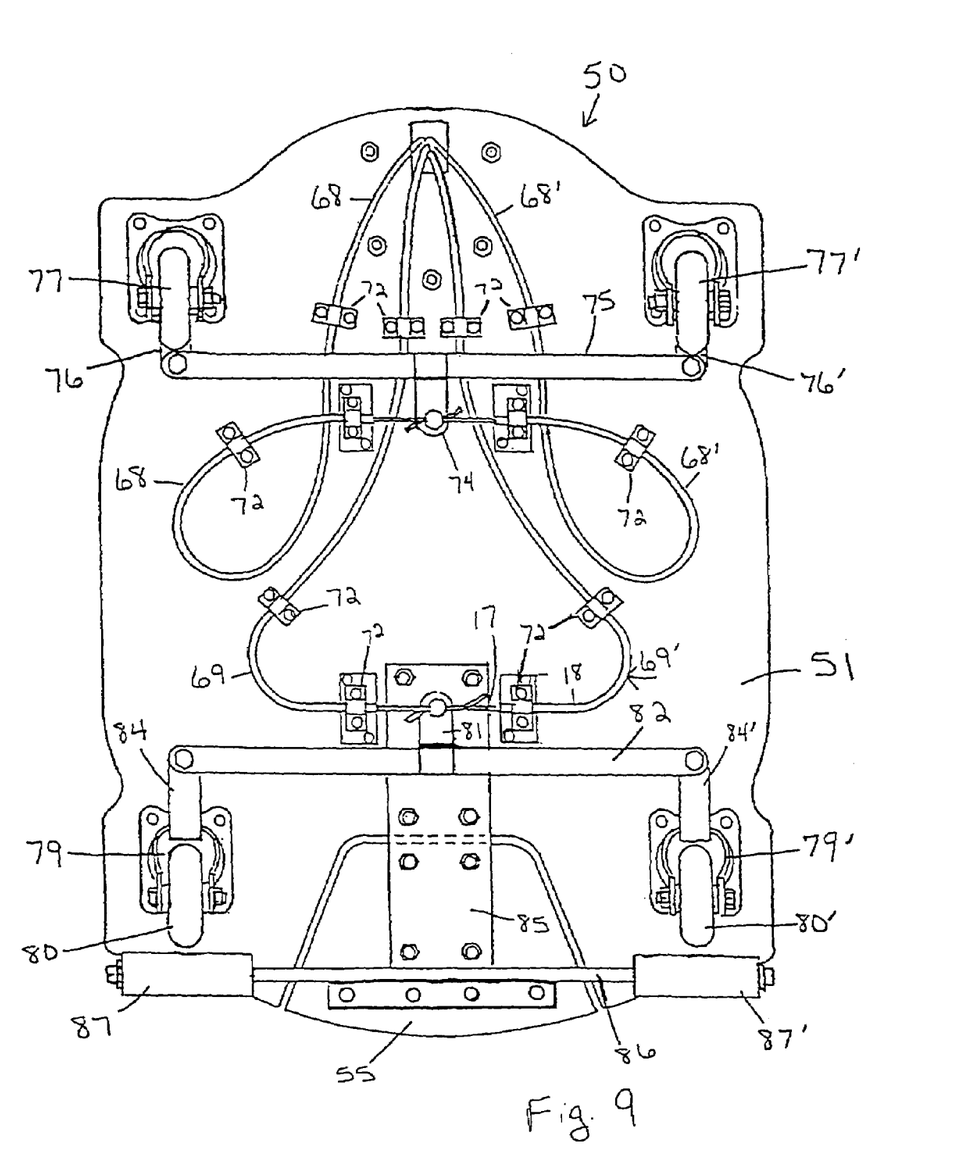
FIG. 9 illustrates a bottom plan view of the scooter as shown in FIG. 5.
Figure 10:
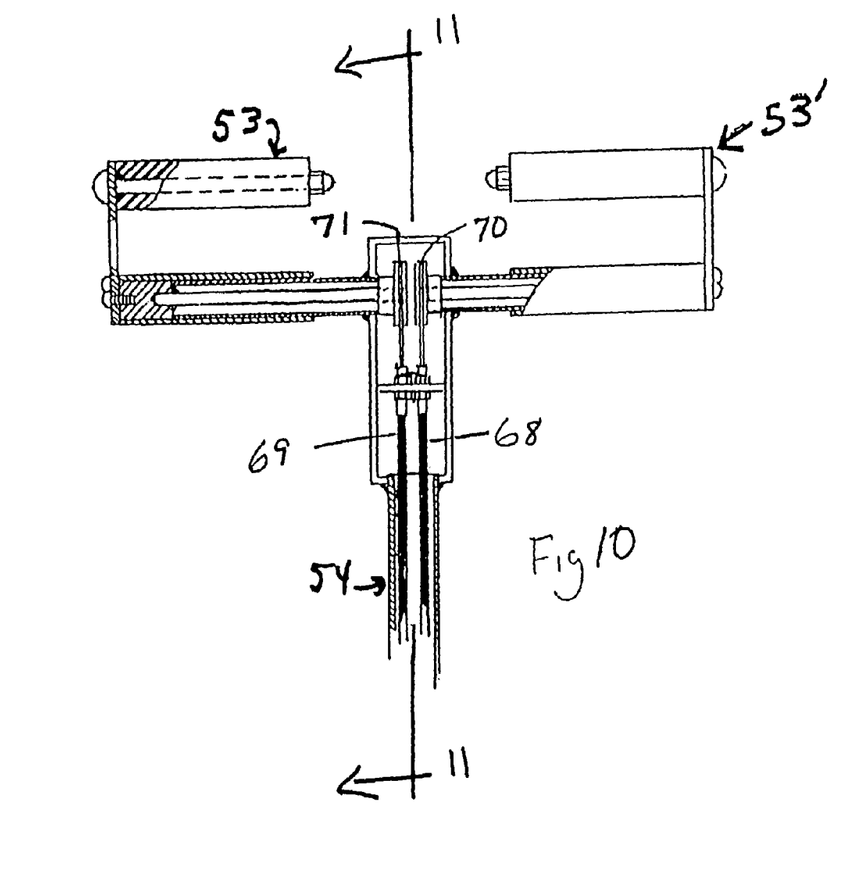
FIG. 10 shows a partial cross-sectional view of the c-shaped handles atop the steering column as seen along lines 10—10 of FIG. 5.

As would be understood, steering column 52 does not rotate for steering scooter 50 in contrast to steering column 12 of preferred scooter 10. Rather, scooter 50 is steered by control cables 68, 68', 69 and 69' as shown in FIG. 9. Cables 68, 68', 69, 69' pass through steering column 52 and telescoping section 54 and attach to c-shaped rotatable handles 53, 53' which are connected to telescoping steering column section 54 as shown in FIG. 10. Cables 68, 68', 69 and 69' are conventional control cables having an outer sheath 18 and a slidable inner wire 17 as earlier described.

Figure 11:
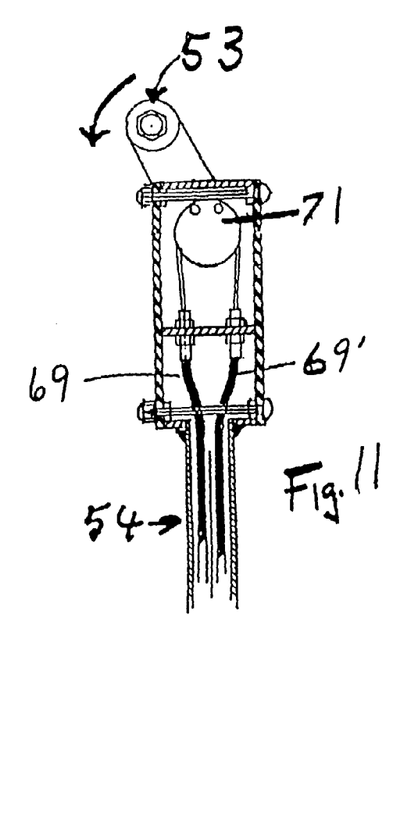
FIG. 11 pictures a cross-sectional side elevational view of one of the c-shaped handles as seen along lines 11—11 of FIG. 10.

As shown in FIGS. 10 and 11, cables 68, 68' are attached to pulley 70 whereby rotating c-shaped handle 53 forwardly as shown by the arrow in FIG. 11, causes tension to be applied to cable 69' while cable 69 is simultaneously relaxed. This causes rear wheels 80, 80' of scooter 50 to turn to the left. Likewise, by pulling handle 53 rearwardly, wheels 80, 80' turn to the right. In the same manner, front wheels 77, 77' can be turned by rotating c-shaped handle 53' forwardly, causing cable 68' attached to pulley 70 to tighten, cable 68 to relax and to turn front wheels 77, 77' to the rider's left, whereas rotating handle 53' rearwardly causes front wheels 77, 77' to turn right.

Cables 68, 68' in FIG. 9 pass through cable guides 72 to manipulate front steering rod 75. As also seen in FIG. 9, cables 68, 68' attach to front steering rod tongue 74 which is rigidly affixed to front steering rod 75. Front steering rod 75 is pivotally joined to first front wheel housing arm 76 and on the opposite end to second front wheel housing arm 76'. Rear steering rod 82 is rigidly affixed to rear steering rod tongue 81. Rear steering rod tongue 81 is affixed to cables 69, 69' as also seen in FIG. 9. Rear steering rod 82 moves from side to side as directed by rotating c-shaped handle 53 and rear housing arms 84, 84' connected respectively to rear wheel housings 79, 79' pivot rear wheels 80, 80' in tandem.

As excessive speed develops during riding scooter 50, such as in a sharp downhill descent of scooter 50, the rider can easily apply desired foot pressure to platform extension 55 which is affixed by planar nylon hinge 85 to platform 51. Hinge 85 is flexible as described with hinge 22 above and when extension 13 is depressed, brake axle 86 affixed thereto causes cylindrical brake pads 87, 87' to contact respectively rear wheels 80, 80' to slow or stop scooter 50. Once forward motion of scooter 50 has sufficiently decreased the rider lifts his foot from platform extension 55 and hinge 85 returns extension 55 to its normal, level coplanar position with platform 51.

The illustrations and examples provided herein are for explanatory purposes and are not intended to limit the scope of the appended claims.

I claim:

1. A scooter comprising: a platform, a steering column, said steering column pivotally joined to said platform, a first front steerable wheel, a first rear steerable wheel, said first front and said first rear wheels each independently steerable from the other, said first front and said first rear wheels attached to said platform, said first front steerable wheel connected to said steering column, a rear steering linkage, said rear steering linkage connected to said first rear wheel, a pivotable handle, said pivotable handle attached to said steering column, a cable, said cable attached to said pivotable handle and to said rear steering linkage whereby turning said steering column will steer said first front wheel and pivoting said handle will cause said first rear wheel to rotate into alignment with said platform.

2. The scooter of claim 1 further comprising a second front wheel, a front steering linkage, said first and said second front wheels connected to said front steering linkage for tandem movement of said first and said second front wheels.

3. The scooter of claim 1 further comprising a second rear wheel, said second rear wheel connected to said rear steering linkage for tandem movement of said first and said second rear wheels.

4. The scooter of claim 1 wherein said cable comprises a sheath, a wire, said wire slidably contained within said sheath.

5. The scooter of claim 1 further comprises a first front wheel housing, said first front wheel housing surrounding said first front wheel, a first housing arm, said first housing arm rigidly connected to said first front wheel housing, a first steering rod, said first housing arm pivotally connected to said first steering rod, a column arm, said column arm affixed to said steering column, and said first steering rod pivotally joined to said column arm.

6. The scooter of claim 1 comprising: a platform extension, said platform extension hingedly connected to said platform, a brake assembly, said brake assembly joined to said platform extension, said brake assembly comprising: an axle, a first brake pad, said first brake pad attached to said axle, said first brake pad proximate said first rear wheel.

7. The scooter of claim 1 further comprising a platform extension, said extension hingedly joined to said platform, a brake assembly, said brake assembly affixed to said platform extension.

8. The scooter of claim 5 further comprising a second front wheel housing, said second front wheel housing surrounding said second front wheel, a second housing arm, said second housing arm rigidly connected to said second front wheel housing, a second steering rod, said second housing arm pivotally connected to said second steering rod and said second steering rod pivotally joined to said column arm.

9. The scooter of claim 6 further comprising a second brake pad, said second brake pad attached to said axle proximate said second rear wheel.

10. The scooter of claim 6 wherein said brake assembly further comprises a second brake pad, said second brake pad cylindrically shaped.

* * * * *